(12) United States Patent
Yang et al.

(10) Patent No.: US 10,849,146 B2
(45) Date of Patent: Nov. 24, 2020

(54) METHOD FOR TRANSMITTING DATA, TERMINAL DEVICE AND NETWORK-SIDE DEVICE

(71) Applicant: GUANGDONG OPPO MOBILE TELECOMMUNICATIONS CORP., LTD., Dongguan, Guangdong (CN)

(72) Inventors: Ning Yang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/326,110

(22) PCT Filed: Aug. 19, 2016

(86) PCT No.: PCT/CN2016/096066
§ 371 (c)(1),
(2) Date: Feb. 15, 2019

(87) PCT Pub. No.: WO2018/032508
PCT Pub. Date: Feb. 22, 2018

(65) Prior Publication Data
US 2019/0191449 A1      Jun. 20, 2019

(51) Int. Cl.
*H04W 72/12* (2009.01)
*H04W 76/10* (2018.01)
(Continued)

(52) U.S. Cl.
CPC ....... *H04W 72/1268* (2013.01); *H04W 64/00* (2013.01); *H04W 76/10* (2018.02);
(Continued)

(58) Field of Classification Search
None
See application file for complete search history.

(56) References Cited

U.S. PATENT DOCUMENTS

| 2005/0053099 A1* | 3/2005 | Spear | G01S 5/0009 370/508 |
| 2011/0223932 A1* | 9/2011 | Hole | H04W 56/0005 455/456.1 |

(Continued)

FOREIGN PATENT DOCUMENTS

| CN | 1744464 | 3/2006 |
| CN | 101444133 | 5/2009 |

(Continued)

OTHER PUBLICATIONS

WIPO, ISR for PCT/CN2016/096066, dated May 8, 2017.
(Continued)

*Primary Examiner* — Brian S Roberts
(74) *Attorney, Agent, or Firm* — Hodgson Russ LLP (57) ABSTRACT

A method for transmitting data includes: determining that a terminal device satisfies a preset condition for reusing a first timing advance (TA) value; and transmitting data according to the first TA value, wherein the first TA value is the value used by the terminal device during the previous instance of data transmission. The method for transmitting data, the terminal device and the network-side device of the embodiments of the present invention can reduce delays and reduce the signaling overhead of a system.

17 Claims, 5 Drawing Sheets

200

DETERMINING THAT A TERMINAL DEVICE SATISFIES A PRESET CONDITION FOR REUSING FIRST TIMING ADVANCE (TA) VALUE — S210

TRANSMITTING DATA ACCORDING TO THE FIRST TA VALUE, WHEREIN THE FIRST TA VALUE IS THE VALUE USED BY THE TERMINAL DEVICE DURING THE PREVIOUS INSTANCE OF DATA TRANSMISSION — S220

(51) Int. Cl.
  *H04W 64/00* (2009.01)
  *H04W 4/70* (2018.01)
  *H04W 72/04* (2009.01)
  *H04W 24/02* (2009.01)
  *H04W 84/04* (2009.01)

(52) U.S. Cl.
  CPC .............. *H04W 4/70* (2018.02); *H04W 24/02* (2013.01); *H04W 64/006* (2013.01); *H04W 72/0446* (2013.01); *H04W 84/042* (2013.01)

(56) References Cited

U.S. PATENT DOCUMENTS

| | | | |
|---|---|---|---|
| 2012/0155310 A1* | 6/2012 | Kreuzer | H04W 52/146 370/252 |
| 2013/0343362 A1 | 12/2013 | Huang et al. | |

FOREIGN PATENT DOCUMENTS

| | | |
|---|---|---|
| CN | 102651908 | 8/2012 |
| CN | 102547836 | 7/2014 |
| CN | 104703120 | 6/2015 |
| EP | 2827660 | 1/2015 |
| JP | 2009531903 | 9/2009 |
| JP | 2013021496 | 1/2013 |
| JP | 2015207951 | 11/2015 |
| JP | 2017510146 | 4/2017 |
| WO | 2015115793 | 8/2015 |

OTHER PUBLICATIONS

EPO, Office Action for EP Application No. 16913264, dated Mar. 28, 2019.
JPO, Office Action for JP Application No. 2019-510345, dated Feb. 28, 2020.
IPI, Office Action for IN Application No. 201917010492, dated Aug. 25, 2020.
EPO, Office Action for EP Application No. 16913264.4, dated Jun. 19, 2020.
SIPO, First Office Action for CN Application No. 201680088488.5, dated Jun. 3, 2020.
CNIPA, Second Office Action for CN Application No. 201680088488.5, dated Aug. 20, 2020.

* cited by examiner

METHOD FOR TRANSMITTING DATA, TERMINAL DEVICE AND NETWORK-SIDE DEVICE

CROSS-REFERENCE TO RELATED APPLICATION

This application is a National Stage Entry of International Application No. PCT/CN2016/096066, filed Aug. 19, 2016, the entire contents of which are incorporated herein by reference.

TECHNICAL FIELD

The present disclosure relates to the field of communication technologies, and more particularly, to a method for transmitting data, a terminal device, and a network side device.

BACKGROUND

At present, a terminal device needs to obtain a timing advance (TA) value to transmit data, and then uses the TA value to transmit data or access a mobile communication system. In a 5G mobile communication technology new radio (NR) prototype system, the terminal device (for example, a terminal device in Internet of Things) needs to support a large number of services supporting packet transmission. Characteristics of services supporting packet transmission are as below: packets needing to be transmitted are small, and after each packet transmission, the terminal device may release a connection with a base station. The terminal device still needs to obtain a new TA value to start data transmission when the terminal device carries out a next data transmission. This may cause a problem that for the terminal device with poor mobility, obtaining a new TA value necessarily may increase delays, and may also increase signaling overhead of a system. On this basis, it is urgently needed to propose a method to solve the problem.

SUMMARY

Embodiments of the present disclosure provide a method for transmitting data, a terminal device, and a network side device, which can reduce delays and reduce signaling overhead.

According to a first aspect, there is provided a method for transmitting data, which includes:
determining that a terminal device satisfies a preset condition for reusing a first timing advance (TA) value; and
transmitting data based on the first TA value, wherein the first TA value is used by the terminal device during a previous data transmission.

According to a second aspect, there is provided a method for transmitting data, which includes:
receiving data transmitted by a terminal device based on a first timing advance (TA) value when determining that the terminal device satisfies a preset condition for reusing the first TA value, wherein the first TA value is used by the terminal device during a previous data transmission.

According to a third aspect, there is provided a terminal device, which is configured to perform the method according to the first aspect or the method according to any possible implementation manner in the first aspect. Specifically, the apparatus includes a unit configured to perform the method according to the first aspect or the method according to any possible implementation manner in the first aspect.

According to a fourth aspect, there is provided a network side device, which is configured to perform the method according to the second aspect or the method according to any possible implementation manner in the second aspect. Specifically, the apparatus includes a unit configured to perform the method according to the second aspect or the method according to any possible implementation manner in the second aspect.

According to a fifth aspect, there is provided a terminal device. The terminal device includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the processor is caused to perform the method according to the first aspect or the method according to any possible implementation manner in the first aspect.

According to a sixth aspect, there is provided a network side device. The network side device includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the processor is caused to perform the method according to the second aspect or the method according to any possible implementation manner in the second aspect.

According to a seventh aspect, there is provided a computer readable storage medium storing a program, which causes the terminal device to perform any method for transmitting data according to the first aspect or according to any possible implementation manner in the first aspect.

According to an eighth aspect, there is provided a computer readable storage medium storing a program, which causes the terminal device to perform any method for transmitting data according to the second aspect or according to any possible implementation manner in the second aspect.

BRIEF DESCRIPTION OF THE DRAWINGS

To describe the technical solutions of the embodiments of the present disclosure more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

It is to be understood that the technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), and other existing communication systems. Particularly, the technical solutions of the embodiments of the present disclosure may be applied to a future 5G system or a 5G New Radio (NR) prototype system.

It is also to be understood that in the embodiments of the present disclosure, the network side device may be also referred to as a network device or a base station, etc. The base station may be a base transceiver station (BTS) in the GSM or CDMA, or may be a NodeB in the WCDMA, or may be an Evolutional Node B (eNB or eNodeB), or may be a base station device in the future 5G network and so on, which is not limited in the present disclosure.

It is also to be understood that in the embodiments of the present disclosure, the terminal device may communicate with one or more core networks via a radio access network (RAN). The terminal device may be referred to as an access terminal, user equipment (UE), a subscriber unit, a subscriber station, a mobile station, a remote station, a remote terminal, a mobile device, a user terminal, a terminal, a wireless communications device, a user agent, or a user apparatus. The terminal device may be a cellular phone, a cordless phone, a SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, and a terminal device in the future 5G network, etc.

Figure 1:
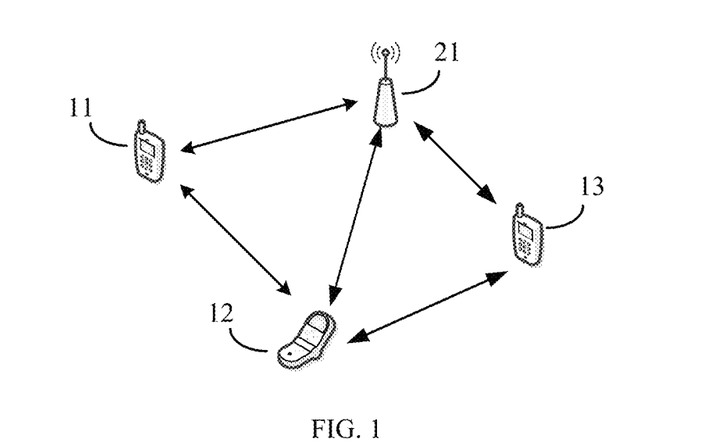
FIG. 1 is a schematic diagram of an application scenario.

FIG. 1 is a schematic diagram of a scenario. It is to be understood that for ease of understanding, reference is made by introducing the scenario in FIG. 1 as an example, but no limitation is imposed on the present disclosure. FIG. 1 illustrates a terminal device 11, a terminal device 12, a terminal device 13, and a base station 21.

As shown in FIG. 1, the terminal device 11 may communicate with the base station 21, the terminal device 12 may communicate with the base station 21, and the terminal device 13 may communicate with the base station 21. Alternatively, the terminal device 12 also may communicate with the terminal device 11. Alternatively, as another case, the terminal device 13 may communicate with the base station 21. The terminal device needs to obtain a timing advance (TA) when accessing the mobile communication system or carrying out data transmission. The TA value may represent a distance between the terminal device and the base station. Alternatively, the TA value is introduced for uplink synchronization to make it convenient to send uplink data.

Procedures for obtaining the TA value are as below: the terminal device sends a known sequence to the base station, for example, a random access preamble sequence in a noncompetitive access scenario or a competitive access scenario. The base station calculates a TA value based on the known sequence, and sends the TA value to the terminal device, wherein the TA value may be carried in a random access response (RAR) message sent by the base station to the terminal device. For example, the terminal device may receive the RAR message sent from the base station, wherein the RAR message includes the TA value. Alternatively, the RAR message may further include an uplink grant (UL grant), wherein the UL grant indicates uplink transmission resource and is used for sends uplink data to the terminal device; and temporary cell identifier (Temporary C-RNTI, TC-RNTI) information, which is used for identifying the terminal device within a cell.

However, in related art, when the location variation range of the terminal device is smaller, the TA value still needs to be recalculated during each data transmission to repeat the "procedures for obtaining the TA value", and next data transmission may be started based on the obtained TA value, which may lead to certain delay. In addition, signaling overhead of a system is increased because it is required to repeat the "procedures for obtaining the TA value". On this basis, the terminal device or the network side device of this patent intends to reuse the TA value used in the previous data transmission to transmit data in the case that the terminal device satisfies some conditions to reach the objective of reducing delays and reducing signaling overhead.

Figure 2:
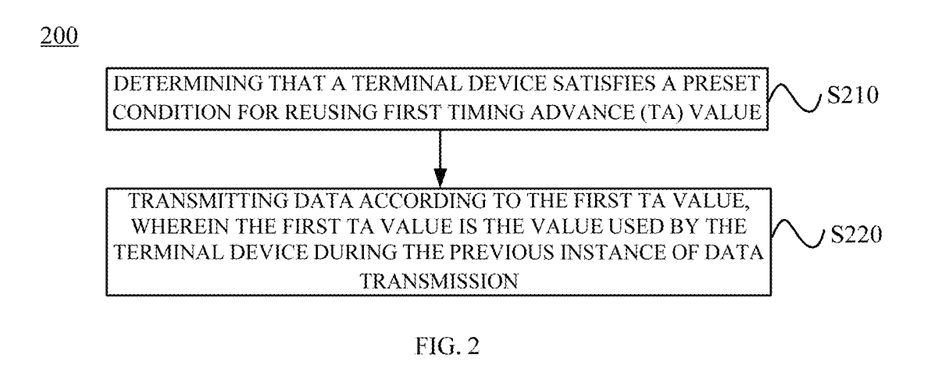
FIG. 2 is a schematic flowchart of a method for transmitting data according to an embodiment of the present disclosure.

FIG. 2 illustrates a schematic flowchart of a method 200 for transmitting data according to an embodiment of the present disclosure. The method 200 may be performed by a terminal device, which may be, for example, the terminal device 11, the terminal device 12 or the terminal device 13 in FIG. 1. As shown in FIG. 2, the method 200 includes:

S210: determining that the terminal device satisfies a preset condition for reusing a first timing advance (TA) value.

Alternatively, the preset condition may be set based on some quantized values corresponding to the location change information of the terminal device, for example, a geographical location value, a movement distance value or a reference signal receiving power (RSRP) value and so on corresponding to the location change information, which is not limited in the present disclosure.

For example, alternatively, an RSRP threshold may be agreed in a protocol, and the terminal device may determine that its location change information satisfies the preset condition as long as the RSRP value of the terminal device is within the RSRP threshold. Alternatively, the RSRP threshold also may be indicated by the base station to the terminal device.

It is to be explained that in the embodiments of the present disclosure, the location change information may represent information that may likely vary with location change of the terminal device, for example, a changed distance value, or a changed RSRP value and so on, which is not limited in the present disclosure.

S220: transmitting data based on the first TA value, wherein the first TA value is used by the terminal device during a previous data transmission.

Specifically, when the terminal device determines that terminal device (for example, the location change information of the terminal device) satisfies the preset condition for reusing the first TA value, the terminal device may transmit data based on the first TA value, and the first TA value is used by the terminal device during the previous data transmission. In this way, the terminal device may skip over the procedure of sending the known sequence to the network side device and directly use the TA value used in the previous data transmission, thus avoiding the procedure of waiting the network side device for recalculating a TA value, which can reduce delays and reduce signaling overhead of the system.

That is, the terminal device may directly reuse the TA value used during the previous data transmission when determining that the terminal device satisfies the preset condition for reusing the first TA value. For example, the terminal device obtains the TA value when establishing a connection with a base station, and releases the connection with the base station upon completion of data transmission. When the terminal device accesses a system or transmits data for a next time, if the terminal device determines that its location change information satisfies the preset condition, the terminal device may skip over the procedure of sending the random access preamble sequence, and may directly use the TA value obtained previously to access the system or transmit data, wherein resources used for transmitting data may be uplink grant (UL grant) resources pre-scheduled by the base station, or may be UL grant resources sent by the base station during contention-based random access.

Alternatively, the first TA value may be obtained when the terminal device is turned on for an initial access. For example, when a cell is attached, the terminal device may obtain the first TA value.

Alternatively, after a connection is established between the terminal device and the base station, when transmitting data, the terminal device may change the TA value based on an instruction of the base station to obtain the first TA value.

Alternatively, the first TA value also may be obtained in the handoff process (i.e., cell handover) of the terminal device. For example, after the terminal device is handed over to a target cell, a new TA value such as the first TA value of the target cell may be obtained.

It is to be understood that in the embodiments of the present disclosure, the first TA value of the terminal device may be obtained in a variety of ways, and the above is merely exemplary description and does not impose limitation on the present disclosure.

It is also to be understood that in the embodiments of the present disclosure, no matter the terminal device obtains the first TA value in any way, the terminal device may reuse the first TA value as long as the location change information of the terminal device satisfies the preset condition. That is, the present disclosure is not limited to manners for obtaining the first TA value.

In the embodiments of the present disclosure, the terminal device determines that the terminal device satisfies a preset condition for reusing a first TA value, and transmits data based on the first TA value. The first TA value is used by the terminal device during a previous data transmission, which can reduce delays and reduce signaling overhead.

It is to be understood that "first" introduced into the "first TA value" is merely for convenience of description, and does not impose any specific limitation on the present disclosure.

Alternatively, as an embodiment, Step S210 may include:
determining that a distance between a current location of the terminal device and a location of the terminal device performing the previous data transmission is not greater than a distance threshold.

Specifically, determining, by the terminal device, that the location change information satisfies the preset condition may include: determining, by the terminal device, that a distance between a current location of the terminal device and a location of the terminal device performing the previous data transmission is not greater than a distance threshold. When this preset condition is satisfied, the terminal device may reuse the TA value used during the previous data transmission to transmit data.

For example, the terminal device may reuse a first TA value if the distance between A (the location of the terminal device when the terminal device obtains the first TA value) and B (the location of the terminal device after the terminal device is moved) is smaller than a preset threshold.

It is to be understood that in the embodiments of the present disclosure, "not greater than the distance threshold" also may be changed into "smaller than the distance threshold", and a size relation thereof may be set or adjusted as required, which is not limited in the present disclosure.

It is to be noted that, alternatively, the distance threshold is not limited to a distance threshold corresponding to the movement distance of the terminal device, and also may be a distance threshold of a distance corresponding to the location of the terminal device after the terminal device is moved. For example, if the distance corresponding to the current location B of the terminal device is k, the distance threshold is n, and k is smaller than n, the terminal device also may determine that its location change information satisfies the preset condition.

Alternatively, as an embodiment, the Step S210 may further include:
receiving the distance threshold sent from a network side device.

Specifically, the terminal device may receive the distance threshold sent from the network side device. Next, the terminal device transmits data based on the first TA value when determining, based on the distance threshold, that its movement distance satisfies the preset condition.

Alternatively, after a connection between the terminal device and the network side device is established, the terminal device may report its geographical location information to the network side device. The network side device may configure a geographical location information scope (for example, the distance threshold) for the terminal device, such that the TA value may be reused when the geographical location information of the terminal device satisfies the geographical location information scope.

Alternatively, the receiving the distance threshold sent from a network side device includes:
receiving the distance threshold sent from the network side device by means of broadcast message or signaling.

In the embodiments of the present disclosure, the terminal device may receive the distance threshold sent from the network side device in the form of a broadcast message or a dedicated signaling, etc. For example, the dedicated signaling may be a radio resource control (RRC) signaling, which is not limited in the present disclosure.

Alternatively, in the embodiments of the present disclosure, the distance threshold also may be agreed in a protocol by the terminal device and the network side device, which is not limited in the present disclosure.

Therefore, by using the method for transmitting data according to the embodiments of the present disclosure, the terminal device determines that the terminal device satisfies a preset condition for reusing a first TA value, and transmits data based on the first TA value. The first TA value is used by the terminal device during a previous data transmission, which can reduce delays and reduce signaling overhead. Further, the preset condition satisfied by the terminal device may be determined by comparing a relation between a movement distance of the terminal device and the distance threshold.

Alternatively, as an embodiment, Step S210 may include:

determining that a signal power value of the terminal device is greater than a signal power lower threshold and smaller than a signal power upper threshold, wherein the signal power upper threshold is greater than the signal power lower threshold.

For example, alternatively, as an embodiment, Step S210 may include:

determining that a reference signal receiving power (RSRP) value of the terminal device is greater than an RSRP lower threshold and smaller than an RSRP upper threshold, wherein the RSRP upper threshold is greater than the RSRP lower threshold.

Specifically, determining, by the terminal device, that the location change information satisfies the preset condition may include: determining, by the terminal device, that the RSRP value of the terminal device is greater than the RSRP lower threshold and smaller than the RSRP upper threshold, wherein the RSRP upper threshold is greater than the RSRP lower threshold. When this preset condition is satisfied, the terminal device also may reuse the TA value used during the previous data transmission to transmit data.

It is to be understood that in the embodiments of the present disclosure, the signal power value is not limited to the RSRP value and also may be other reasonable power values that may represent the preset condition for reusing the first TA value by the terminal device, which is not limited in the present disclosure.

In the embodiments of the present disclosure, the RSRP value represents a key parameter with regard to a wireless signal strength of the terminal device in a long term evolution (LTE) network, reflects a base station signal strength measured by the terminal device, and may be used to describe the location change information of the terminal device.

For example, when the terminal device carries out the previous data transmission based on the first TA value, the RSRP value corresponding to the terminal device is 100 db, the RSRP lower threshold is 95 db, and the RSRP upper threshold is 105 db. The first TA value corresponding to 100 db may be employed to transmit data as long as the RSRP value corresponding to the terminal device is within 95 db-105 db. Alternatively, in another case, it also may be regarded that the first TA value may be reused when a variation value of the terminal device ranges from −5 db to +5 db.

For another example, the terminal device may move in an arc taking the base station as a center, and the location of the terminal device may have a corresponding RSRP value. The terminal device may reuse the TA value if the terminal device moves within the scope of the arc-shaped region.

Alternatively, as an embodiment, the method 200 may further include:

receiving the signal power upper threshold and the signal power lower threshold sent from a network side device.

For example, alternatively, as an embodiment, the Step S200 may further include:

receiving the RSRP upper threshold and the RSRP lower threshold sent from the network side device.

Specifically, the terminal device may receive the RSRP upper threshold and the RSRP lower threshold sent from the network side device, and then may transmit data based on the first TA value when determining, based on the RSRP upper threshold and the RSRP lower threshold, that the RSRP value satisfies the preset condition.

Alternatively, the receiving the RSRP upper threshold and the RSRP lower threshold sent from the network side device includes:

receiving the RSRP upper threshold and the RSRP lower threshold sent from the network side device by means of broadcast message or signaling.

In the embodiments of the present disclosure, the terminal device may receive the RSRP upper threshold and the RSRP lower threshold sent from the network side device by means of broadcast message or dedicated signaling, which is not limited in the present disclosure.

Alternatively, in the embodiments of the present disclosure, the RSRP upper threshold and the RSRP lower threshold also may be agreed by the terminal device and the network side device in a protocol, which is not limited in the present disclosure.

Alternatively, as an embodiment, Step S210 further includes:

determining that the signal power value of the terminal device is greater than the signal power lower threshold and smaller than the signal power upper threshold within a predetermined time period, wherein the signal power upper threshold is greater than the signal power lower threshold.

For example, alternatively, as an embodiment, Step S210 further includes:

determining that the RSRP value of the terminal device is greater than the RSRP lower threshold and smaller than the RSRP upper threshold within a predetermined time period, wherein the RSRP upper threshold is greater than the RSRP lower threshold.

Specifically, the terminal device may reuse the first TA value to transmit data within the predetermined time period if the terminal device determines that the RSRP value of the terminal device is greater than the RSRP lower threshold and smaller than the RSRP upper threshold within the predetermined time period, wherein the RSRP upper threshold is greater than the RSRP lower threshold.

Alternatively, the method 200 further includes:

receiving indication information sent from the network side device, the indication information being used for indicating the predetermined time period.

Specifically, the terminal device may receive the indication information sent from the network side device, wherein the indication information is used for indicating the predetermined time period. Alternatively, during specific implementation, the predetermined time period may be a timer set by the base station for the terminal device. For example, the first TA value is reused as long as the terminal device measures and determines that the base station signal intensity is not greater than a range within a few minutes. The signal intensity may be represented by the RSRP value of the terminal device, and the range may be represented by the RSRP upper threshold and the RSRP lower threshold.

Alternatively, in the embodiments of the present disclosure, the indication information sent from the network side device used for indicating the predetermined time period of the terminal device also may be carried in the broadcast message or signaling.

It is to be understood that in the embodiments of the present disclosure, reference is made in the present disclosure only by taking the distance threshold, the RSRP upper threshold and the RSRP lower threshold as examples. However, the terminal device also may determine the preset condition based on other reasonable information or indicators that may represent the location variation range of the terminal device, which is not limited in the present disclosure.

Therefore, by using the method for transmitting data according to the embodiments of the present disclosure, the terminal device determines that the terminal device satisfies a preset condition for reusing a first TA value, and transmits data based on the first TA value. The first TA value is used by the terminal device during a previous data transmission, which can reduce delays and reduce signaling overhead. Further, the preset condition satisfied by the terminal device may be determined by comparing the RSRP value of the terminal device with the RSRP upper threshold and the RSRP lower threshold.

It is to be understood that in the embodiments of the present disclosure, a sequence number of each step does not mean an execution sequence, and the execution sequence of each step shall be determined by its function and an internal logic, and shall not impose a limit on the implementation process of the embodiments of the present disclosure.

The method for transmitting data according to the embodiments of the present disclosure is described above from the point of the terminal device, and the method for transmitting data according to the embodiments of the present disclosure will be described below from the point of the network side device. It is to be understood that for brevity, some repetitive concepts or contents related to the terminal device are omitted.

Figure 3:
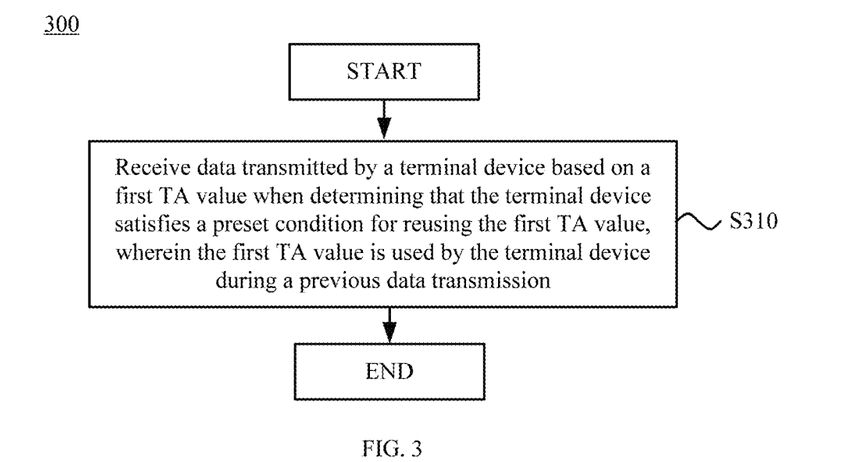
FIG. 3 is a schematic flowchart of a method for transmitting data according to another embodiment of the present disclosure.

FIG. 3 illustrates a schematic flowchart of a method 300 for transmitting data according to another embodiment of the present disclosure. The method 300 may be performed by a network side device, which may be, for example, the base station 21 in FIG. 1. As shown in FIG. 3, the method 300 includes:

Step S310: receiving data transmitted by a terminal device based on a first timing advance (TA) value when determining that the terminal device satisfies a preset condition for reusing the first TA value, wherein the first TA value is used by the terminal device during a previous data transmission.

In the embodiments of the present disclosure, the network side device may receive data transmitted by the terminal device based on the first TA value, which is used by the terminal device during the previous data transmission. The terminal device reuses the first TA value when determining that location change information of the terminal device satisfies the preset condition. Therefore, the network side device does not need to recalculate a new TA value for the terminal device, and thus delays can be reduced, and the signaling overhead of a system can be reduced.

Alternatively, as an embodiment, before Step S310, the method 300 further includes:

sending a distance threshold to the terminal device.

Step S310 includes:

receiving the data transmitted by the terminal device based on the first TA value when determining that a distance between a current location of the terminal device and a location of the terminal device performing the previous data transmission is not greater than the distance threshold.

Specifically, the network side device may send the distance threshold to the terminal device, such that the terminal device may determine whether the terminal device satisfies the preset condition based on the distance threshold. The network side device may receive the data sent by the terminal device to the network side device to reuse the first TA value when the terminal device determines that the distance between the current location of the terminal device and the location of the terminal device performing the previous data transmission is not greater than the distance threshold.

Alternatively, the sending a distance threshold to the terminal device includes:

sending the distance threshold to the terminal device by means of broadcast message or signaling.

Specifically, the network side device may send the distance threshold to the terminal device by means of broadcast message or dedicated signaling (such as RRC signaling) and so on, which is not limited in the present disclosure.

Therefore, the network side device may receive the data transmitted by the terminal device based on the first TA value when determining that the terminal device satisfies the preset condition for reusing the first TA value, wherein the first TA value is used by the terminal device during the previous data transmission. Therefore, the network side device does not need to recalculate a new TA value for the terminal device, which can reduce delays and reduce signaling overhead of the system. Further, the network side device may send the distance threshold to the terminal device, such that the terminal device determines that the terminal device satisfies the preset condition for reusing the first TA value based on the distance threshold.

Alternatively, as an embodiment, before Step S310, the method 300 further includes:

sending a signal power upper threshold and a signal power lower threshold to the terminal device, wherein the signal power upper threshold is greater than the signal power lower threshold.

Step S310 includes:

receiving the data transmitted by the terminal device based on the first TA value when determining that a signal power value of the terminal device is greater than the signal power lower threshold and smaller than the signal power upper threshold.

For example, alternatively, as an embodiment, before Step S310, the method 300 further includes:

sending a reference signal receiving power (RSRP) upper threshold and an RSRP lower threshold to the terminal device, wherein the RSRP upper threshold is greater than the RSRP lower threshold.

Step S310 includes:

receiving the data transmitted by the terminal device based on the first TA value when determining that an RSRP value of the terminal device is greater than the RSRP lower threshold and smaller than the RSRP upper threshold.

Specifically, the network side device may send the RSRP upper threshold and the RSRP lower threshold to the terminal device, such that the terminal device may determine whether the terminal device satisfies the preset condition based on the RSRP upper threshold and the RSRP lower threshold. The network side device may receive the data transmitted by the terminal device to the network side device to reuse the first TA value when the terminal device determines that the RSRP value of the terminal device is greater than the RSRP lower threshold and smaller than the RSRP upper threshold.

Alternatively, the sending an RSRP upper threshold and an RSRP lower threshold to the terminal device includes:

sending the RSRP upper threshold and the RSRP lower threshold to the terminal device by means of broadcast message or signaling.

Specifically, the network side device may send the RSRP upper threshold and the RSRP lower threshold to the terminal device by means of broadcast message or dedicated signaling (such as RRC signaling) and so on, which is not limited in the present disclosure.

Alternatively, the method 300 further includes:

sending indication information to the terminal device, the indication information being used for indicating a predetermined time period.

The receiving the data transmitted by the terminal device based on the first TA value when determining that location change information of the terminal device satisfies the preset condition includes:

receiving the data transmitted by the terminal device based on the first TA value within the predetermined time period when determining that a reference signal receiving power (RSRP) value of the terminal device is greater than the RSRP lower threshold and smaller than the RSRP upper threshold.

Specifically, the network side device may send indication information to the terminal device, the indication information being used for indicating the predetermined time period of the terminal device, such that the terminal device may send the data to the network side device based on the first TA value within the predetermined time period when determining that the RSRP value of the terminal device is greater than the RSRP lower threshold and smaller than the RSRP upper threshold.

Alternatively, during specific implementation, the predetermined time period may be interpreted as a timer set by the network side device for the terminal device. For example, the first TA value is reused as long as the terminal device measures and determines that the base station signal intensity is not greater than a range within a few minutes.

Therefore, the network side device may receive the data transmitted by the terminal device based on the first TA value when determining that the terminal device satisfies the preset condition for reusing the first TA value, wherein the first TA value is used by the terminal device during the previous data transmission. Therefore, the network side device does not need to recalculate a new TA value for the terminal device, which can reduce delays and reduce signaling overhead of the system. Further, the network side device may send the RSRP upper threshold and the RSRP lower threshold to the terminal device, such that the terminal device determines, based on the RSRP upper threshold and the RSRP lower threshold, that the location change information of the terminal device satisfies the preset condition for reusing the first TA value.

It is to be understood that in the embodiments of the present disclosure, a sequence number of each step does not mean an execution sequence, and the execution sequence of each step shall be determined by its function and an internal logic, and shall not impose a limit on the implementation process of the embodiments of the present disclosure.

The method for transmitting data according to the embodiments of the present disclosure is described above from the point of the terminal device and the network side device, and the terminal device and the network side device according to the embodiments of the present disclosure will be described below.

Figure 4:
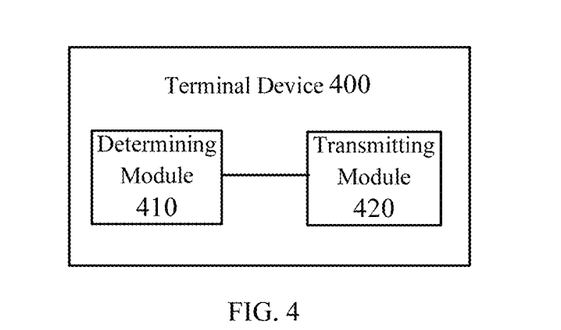
FIG. 4 is a schematic block diagram of a terminal device according to an embodiment of the present disclosure.

FIG. 4 illustrates a schematic block diagram of a terminal device 400 according to an embodiment of the present disclosure. As shown in FIG. 4, the terminal device 400 includes:

a determining module 410, configured to determine that the terminal device satisfies a preset condition for reusing a first timing advance (TA) value; and a transmitting module 420, configured to transmit data based on the first TA value, wherein the first TA value is used by the terminal device during a previous data transmission.

In the embodiments of the present disclosure, the terminal device determines that the terminal device satisfies the preset condition for reusing a first TA value, and transmits data based on the first TA value. The first TA value is used by the terminal device during a previous data transmission, which can reduce delays and reduce signaling overhead.

Alternatively, as an embodiment, the determining module 410 is specifically configured to:

determine that a distance between a current location of the terminal device and a location of the terminal device performing the previous data transmission is not greater than a distance threshold.

Alternatively, the terminal device 400 further includes:

a first receiving module, configured to receive the distance threshold sent from a network side device.

Alternatively, as an embodiment, the determining module 410 is specifically configured to:

determine that a signal power value of the terminal device is greater than a signal power lower threshold and smaller than a signal power upper threshold, wherein the signal power upper threshold is greater than the signal power lower threshold.

Alternatively, the terminal device 400 further includes:

a second receiving module, configured to receive the signal power upper threshold and the signal power lower threshold sent from the network side device.

Alternatively, the determining module 410 is specifically configured to:

determine that the signal power value of a reference signal receiving power of the terminal device is greater than the signal power lower threshold and smaller than the signal power upper threshold within a predetermined time period, wherein the signal power upper threshold is greater than the signal power lower threshold.

Alternatively, the terminal device 400 further includes:

a third receiving module, configured to receive indication information sent from the network side device, the indication information being used for indicating the predetermined time period.

Alternatively, the first receiving module is specifically configured to:

receive the distance threshold sent from the network side device by means of broadcast message or signaling.

Alternatively, the second receiving module is specifically configured to:

receive the signal power upper threshold and the signal power lower threshold sent from the network side device by means of broadcast message or signaling.

The terminal device 400 according to the embodiments of the present disclosure may perform the method 200 for transmitting data according to the embodiments of the present disclosure, and the above and other operations and/or functions of each module in the terminal device 400 are provided respectively to implement corresponding procedure of the foregoing methods, and their detailed descriptions are omitted here for brevity.

Therefore, the terminal device 400 according to the embodiments of the present disclosure determines that the terminal device satisfies the preset condition for reusing the first TA value, and transmits data based on the first TA value. The first TA value is used by the terminal device during the previous data transmission, which can reduce delays and reduce signaling overhead of a system.

Figure 5:
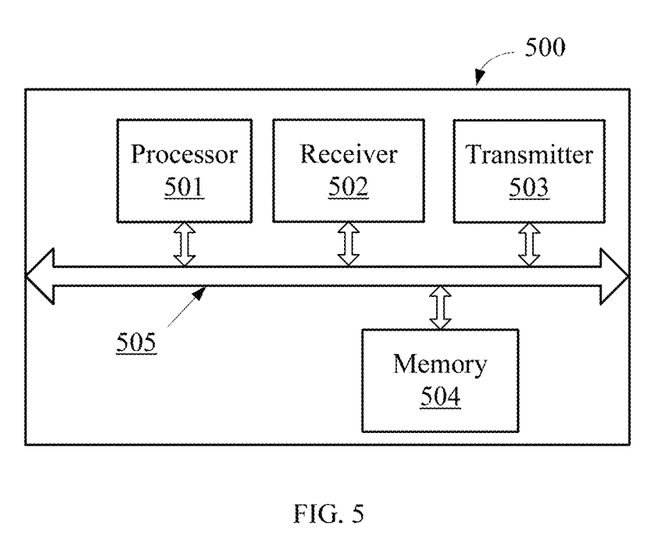
FIG. 5 is a structural block diagram of a terminal device according to an embodiment of the present disclosure.

It is to be noted that in the embodiments of the present disclosure, the transmitting module 420 may be implemented by a sender, the receiving module may be implemented by a receiver, and the determining module 410 may be implemented by a processor. As shown in FIG. 5, the terminal device 500 may include a processor 501, a receiver 502, a sender 503, and a memory 504. The memory 504 may be configured to store a code executed by the processor 501, etc. The processor 501 is configured to execute the code stored in the memory 504.

Each component of the terminal device 500 is coupled through a bus system 505, wherein the bus system 505 includes a data bus, and further includes a power bus, a control bus, and a status signal bus.

Figure 6:
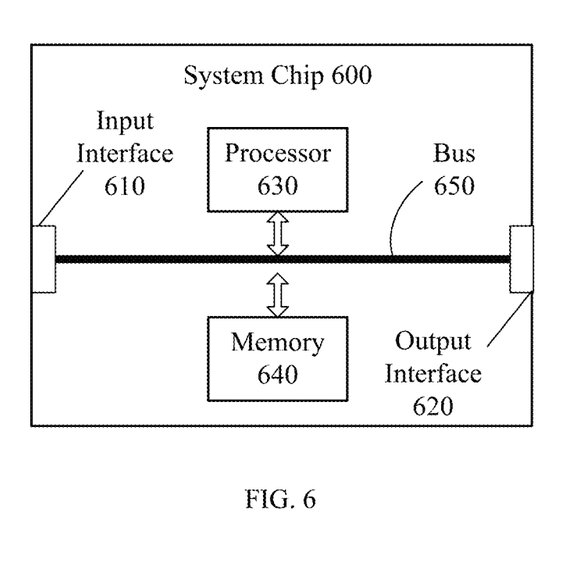
FIG. 6 is a schematic structural diagram of a system chip according to an embodiment of the present disclosure.

FIG. 6 is a schematic structural diagram of a system chip according to an embodiment of the present disclosure. The system chip 600 in FIG. 6 includes an input interface 610, an output interface 620, at least one processor 630, and a memory 640. The input interface 610, the output interface 620, the processor 630 and the memory 640 are connected by a bus 650. The processor 630 is configured to execute a code stored in the memory 640. When the code is executed, the processor 630 implements the method performed by the terminal device in FIG. 2.

The terminal device 400 as shown in FIG. 4 or the terminal device 500 as shown in FIG. 5 or the system chip 600 as shown in FIG. 6 can implement each procedure implemented by the terminal device in the foregoing method embodiments in FIG. 2. To avoid repetitions, their detailed descriptions are omitted herein.

Figure 7:
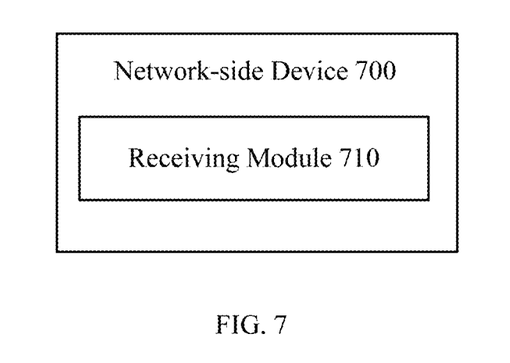
FIG. 7 is a schematic block diagram of a network side device according to an embodiment of the present disclosure.

FIG. 7 illustrates a schematic block diagram of a network side device 700 according to an embodiment of the present disclosure. As shown in FIG. 7, the network side device 700 includes:

a receiving module 710, configured to receive data transmitted by a terminal device based on a first timing advance (TA) value when determining that the terminal device satisfies a preset condition for reusing the first TA value, wherein the first TA value is used by the terminal device during a previous data transmission.

In the embodiments of the present disclosure, the network side device may receive data transmitted by the terminal device based on the first TA value, which is used by the terminal device during the previous data transmission. The terminal device reuses the first TA value when determining that the terminal device satisfies the preset condition for reusing the first TA value. Therefore, the network side device does not need to recalculate a new TA value for the terminal device, and thus delays can be reduced, and the signaling overhead of a system can be reduced.

Alternatively, as an embodiment, the network side device further includes:

a first sending module, configured to send a distance threshold to the terminal device.

The receiving module 710 is specifically configured to:

receive the data transmitted by the terminal device based on the first TA value when determining that a distance between a current location of the terminal device and a location of the terminal device performing the previous data transmission is not greater than the distance threshold sent by the first sending module.

Alternatively, the first sending module is specifically configured to:

send the distance threshold to the terminal device by means of broadcast message or signaling.

Alternatively, as an embodiment, the network side device further includes:

a second sending module, configured to send a signal power upper threshold and a signal power lower threshold of a reference signal receiving power to the terminal device, wherein the signal power upper threshold is greater than the signal power lower threshold.

The receiving module is specifically configured to:

receive the data transmitted by the terminal device based on the first TA value when determining that a signal power value of the reference signal receiving power of the terminal device is greater than the signal power lower threshold sent by the second sending module and smaller than the signal power upper threshold sent by the second sending module.

Alternatively, as an embodiment, the network side device further includes:

a third sending module, configured to send indication information to the terminal device, the indication information being used for indicating a predetermined time period.

The receiving module is specifically configured to:

receive the data transmitted by the terminal device based on the first TA value within the predetermined time period when determining that the signal power value of the reference signal receiving power of the terminal device is greater than the signal power lower threshold and smaller than the signal power upper threshold.

Alternatively, the second sending module is specifically configured to:

send the signal power upper threshold and the signal power lower threshold to the terminal device by means of broadcast message or signaling.

The network side device 700 according to the embodiments of the present disclosure may perform the method 300 for transmitting data according to the embodiments of the present disclosure, and the above and other operations and/or functions of each module in the network side device 700 are provided respectively to implement corresponding procedure of the foregoing methods, and their detailed descriptions are omitted here for brevity.

Therefore, the network side device 700 according to the embodiments of the present disclosure may receive the data transmitted by the terminal device based on the first TA value when determining that the terminal device satisfies the preset condition for reusing the first TA value, wherein the first TA value is used by the terminal device during the previous data transmission. Therefore, the network side device does not need to recalculate a new TA value for the terminal device, which can reduce delays and reduce signaling overhead of the system.

Figure 8:
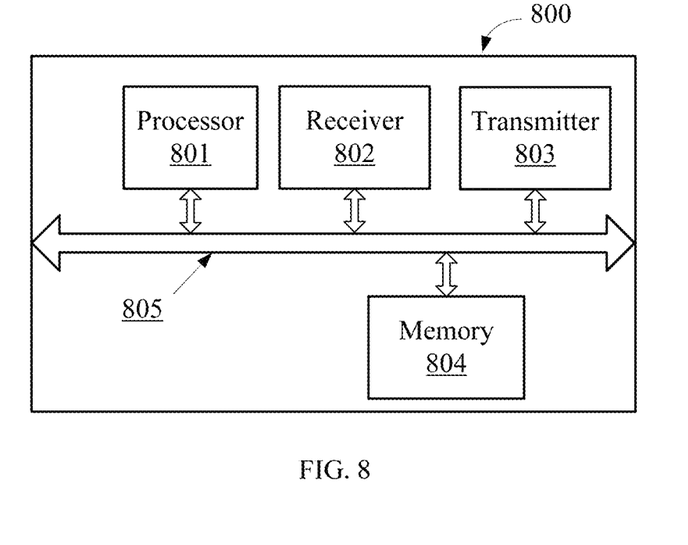
FIG. 8 is a structural block diagram of a network side device according to an embodiment of the present disclosure.

It is to be noted that in the embodiments of the present disclosure, the receiving module 710 is implemented by a receiver, and the first sending module, the second sending module and the third sending module may be implemented by a sender. As shown in FIG. 8, the network side device 800 may include a processor 801, a receiver 802, a sender 803, and a memory 804. The memory 804 may be configured to store a code executed by the processor 801, etc. The processor 801 is configured to execute the code stored in the memory 804.

Each component of the network side device 800 is coupled through a bus system 805, wherein the bus system 805 includes a data bus, and further includes a power bus, a control bus, and a status signal bus.

Figure 9:
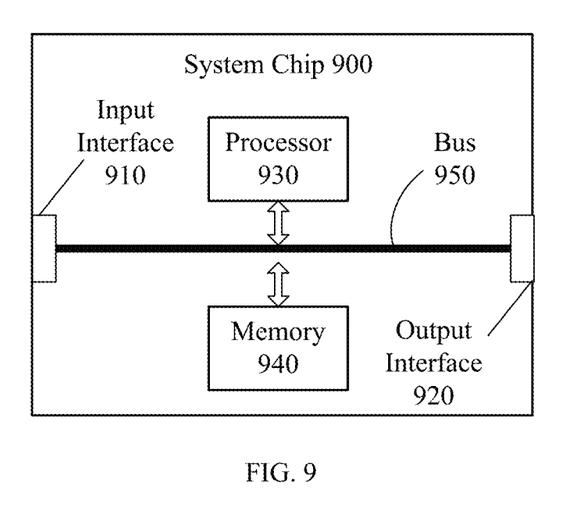
FIG. 9 is a schematic structural diagram of a system chip according to an embodiment of the present disclosure.

FIG. 9 is a schematic structural diagram of a system chip according to an embodiment of the present disclosure. The system chip 900 in FIG. 9 includes an input interface 910, an output interface 920, at least one processor 930, and a memory 940. The input interface 910, the output interface 920, the processor 930 and the memory 940 are connected by a bus 950. The processor 930 is configured to execute a code stored in the memory 940. When the code is executed, the processor 930 implements the method performed by the network side device in FIG. 3.

The network side device 700 as shown in FIG. 7 or the network side device 800 as shown in FIG. 8 or the system chip 900 as shown in FIG. 9 can implement each procedure implemented by the network side device in the foregoing method embodiments in FIG. 3. To avoid repetitions, their detailed descriptions are omitted herein.

It is to be understood that the processor in the embodiments of the present disclosure may be an integrated circuit chip having a signal processing capability. In an implementation process, steps of the foregoing method embodiments may be implemented by using an integrated logic circuit of hardware in the processor or an instruction in a software form. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the methods disclosed in the embodiments of the present disclosure may be directly executed by a hardware decoding processor, or may be executed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and implements the steps of the foregoing methods in combination with the hardware of the processor.

It can be understood that the memory in the embodiments of the present disclosure may be a volatile memory or a non-volatile memory, or may include both of a volatile memory and a non-volatile memory. The non-volatile memory may include: a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. According to description that can be used as an example but imposes no limitation, RAMs of many forms are applicable, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). It is to be noted that the memory in the system and the method described in this specification intends to include, but is not limited to, these memories and any other memory of a suitable type.

Moreover, terms "system" and "network" herein are often used interchangeably herein. It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

It is to be understood that in the embodiments of the present disclosure, "B corresponding to A" represents that the B is associated with the A, and the B may be determined based on the A. It is also to be understood that to determine the B based on the A does not mean that the B is determined merely based on the A, instead, the B may be determined based on the A and/or other information.

It is to be understood that in the embodiments of the present disclosure, a sequence number of each step does not mean an execution sequence, and the execution sequence of each step shall be determined by its function and an internal logic, and shall not impose a limit on the implementation process of the embodiments of the present disclosure.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the present disclosure, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For example, multiple units or components may be combined or integrated into another system, or some features may be ignored and not executed. For another thing, inter-coupling or direct coupling or communications connection displayed or discussed may be indirect coupling or communications connection, electrical or mechanical or in other forms, by means of some interfaces, apparatuses or units.

The unit serving as a detached component may be or not be physically detached, the component serving as a unit display may be or not be a physical unit, i.e., either located at one place or distributed on a plurality of network elements. Units may be selected in part or in whole according to actual needs for achieving objectives of the solution of this embodiment.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium comprises: a USB flash disk, a mobile hard disk, a read-only memory (ROM), a random access memory (RAM), a magnetic disk or an optical disk and other media capable of storing a program code.

The abovementioned embodiments are merely the embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the protection scope of the present disclosure shall be subject to that of the claims.

What is claimed is:

1. A method for transmitting data, comprising:
   determining that a terminal device satisfies a preset condition for reusing a first timing advance (TA) value; and
   transmitting data based on the first TA value, wherein the first TA value is used by the terminal device during a previous data transmission;
   wherein the determining that a terminal device satisfies a preset condition for reusing a first timing advance (TA) value comprises:
   determining that a signal power value of the terminal device is greater than a signal power lower threshold and smaller than a signal power upper threshold, wherein the signal power upper threshold is greater than the signal power lower threshold.

2. The method according to claim 1, wherein the determining that a terminal device satisfies a preset condition for reusing a first timing advance (TA) value comprises:
   determining that a distance between a current location of the terminal device and a location of the terminal device performing the previous data transmission is not greater than a distance threshold.

3. The method according to claim 2, further comprising:
   receiving the distance threshold sent from a network side device.

4. The method according to claim 3, wherein the receiving the distance threshold sent from a network side device comprises:
   receiving the distance threshold sent from the network side device by means of broadcast message or signaling.

5. The method according to claim 1, further comprising:
   receiving the signal power upper threshold and the signal power lower threshold sent from a network side device.

6. The method according to claim 5, wherein the receiving the signal power upper threshold and the signal power lower threshold sent from the network side device comprises:
   receiving the signal power upper threshold and the signal power lower threshold sent from the network side device by means of broadcast message or signaling.

7. The method according to claim 1, wherein the determining that a terminal device satisfies a preset condition for reusing a first timing advance (TA) value further comprises:
   determining that the signal power value of the terminal device is greater than the signal power lower threshold and smaller than the signal power upper threshold within a predetermined time period, wherein the signal power upper threshold is greater than the signal power lower threshold.

8. The method according to claim 7, further comprising:
   receiving indication information sent from the network side device, the indication information being used for indicating the predetermined time period.

9. A method for transmitting data, comprising:
   sending a signal power upper threshold and a signal power lower threshold to a terminal device, wherein the signal power upper threshold is greater than the signal power lower threshold;
   receiving data transmitted by the terminal device based on a first timing advance (TA) value when determining that the terminal device satisfies a preset condition for reusing the first TA value, wherein the first TA value is used by the terminal device during a previous data transmission;
   wherein the receiving data transmitted by a terminal device based on a first timing advance (TA) value when determining that the terminal device satisfies a preset condition for reusing the first TA value comprises:
   receiving the data transmitted by the terminal device based on the first TA value when determining that a signal power value of the terminal device is greater than the signal power lower threshold and smaller than the signal power upper threshold.

10. The method according to claim 9, wherein before the receiving data transmitted by a terminal device based on a first timing advance (TA) value when determining that the terminal device satisfies a preset condition for reusing the first TA value, the method further comprises:
    sending a distance threshold to the terminal device;
    wherein the receiving data transmitted by a terminal device based on a first timing advance (TA) value when determining that the terminal device satisfies a preset condition for reusing the first TA value comprises:
    receiving data transmitted by the terminal device based on the first TA value when determining that a distance between a current location of the terminal device and a location of the terminal device performing the previous data transmission is not greater than the distance threshold.

11. The method according to claim 10, wherein the sending a distance threshold to the terminal device comprises:
    sending the distance threshold to the terminal device by means of broadcast message or signaling.

12. The method according to claim 10, further comprising:
    sending indication information to the terminal device, the indication information being used for indicating a predetermined time period;
    wherein the receiving the data transmitted by the terminal device based on the first TA value when determining that location change information of the terminal device satisfies the preset condition comprises:

receiving the data transmitted by the terminal device based on the first TA value within the predetermined time period when determining that a signal power value of the terminal device is greater than the signal power lower threshold and smaller than the signal power upper threshold.

13. The method according to claim 9, wherein the sending a signal power upper threshold and a signal power lower threshold to the terminal device comprises:

sending the signal power upper threshold and the signal power lower threshold to the terminal device by means of broadcast message or signaling.

14. A terminal device, comprising:

a processor; and a memory for storing instructions executable by the processor;

wherein the processor is configured to perform:

determining that a terminal device satisfies a preset condition for reusing a first timing advance (TA) value; and transmitting data based on the first TA value, wherein the first TA value is used by the terminal device during a previous data transmission;

wherein the processor configured to perform determining that a terminal device satisfies a preset condition for reusing a first timing advance (TA) value is configured to perform:

determining that a signal power value of the terminal device is greater than a signal power lower threshold and smaller than a signal power upper threshold, wherein the signal power upper threshold is greater than the signal power lower threshold.

15. The terminal device according to claim 14, wherein the processor configured to perform determining that a terminal device satisfies a preset condition for reusing a first timing advance (TA) value is configured to perform:

determining that a distance between a current location of the terminal device and a location of the terminal device performing the previous data transmission is not greater than a distance threshold.

16. The terminal device according to claim 14, wherein the processor is further configured to perform:

receiving the signal power upper threshold and the signal power lower threshold sent from a network side device.

17. The terminal device according to claim 15, wherein the processor is further configured to perform:

receiving the distance threshold sent from a network side device.

* * * * *